(12) United States Patent
Ong et al.

(10) Patent No.: US 7,733,372 B2
(45) Date of Patent: *Jun. 8, 2010

(54) METHOD AND SYSTEM FOR VIDEO QUALITY MEASUREMENTS

(75) Inventors: Ee Ping Ong, Singapore (SG); Xiaokang Yang, Singapore (SG); Weisi Lin, Singapore (SG); Zhongkang Lu, Singapore (SG); Susu Yao, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 696 days.

This patent is subject to a terminal disclaimer.

(21) Appl. No.: 10/581,579

(22) Filed: Apr. 13, 2007

(65) Prior Publication Data

US 2007/0257988 A1 Nov. 8, 2007

Related U.S. Application Data

(60) Provisional application No. 60/526,249, filed on Dec. 2, 2003.

(51) Int. Cl.
 *H04N 17/00* (2006.01)
(52) U.S. Cl. .................................. 348/180; 348/192
(58) Field of Classification Search .......... 348/180–193
 See application file for complete search history.

(56) References Cited

U.S. PATENT DOCUMENTS 5,818,520 A  10/1998 Janko et al.
6,075,884 A   6/2000 Lubin et al.
6,246,435 B1  6/2001 Patel
6,285,797 B1  9/2001 Lubin et al.
2003/0086001 A1 5/2003 Zeidler
2004/0114685 A1* 6/2004 Kouloheris et al. ..... 375/240.03
2007/0263897 A1* 11/2007 Ong et al. .................. 382/100

FOREIGN PATENT DOCUMENTS

WO  WO 02/089344  11/2002

OTHER PUBLICATIONS

Zhou Wang et al., "No-Reference Perceptual Quality Assessment of JPEG Compressed Images", Laboratory for Image and Video Engineering, Dept. of Electrical and Computer Engineering, University of Texas at Austin, IEEE, ICIP, 2002.

(Continued)

*Primary Examiner*—M. Lee
(74) *Attorney, Agent, or Firm*—Finnegan, Henderson, Farabow, Garrett & Dunner, L.L.P.

(57) ABSTRACT

A method of measuring a quality of a test video stream, the method comprising measuring a content richness fidelity feature of the test video stream based on occurrences of color values in image frames of the test video stream; measuring a block-fidelity feature of the test video stream based on distortion at block-boundaries in the image frames of the test video stream; measuring a distortion-invisibility feature of the test video stream based on distortion at pixels of the image frames of the test video stream; and determining a quality rating for the test video stream based on the content richness fidelity feature, the block-fidelity feature and the distortion-invisibility feature measured.

15 Claims, 8 Drawing Sheets

OTHER PUBLICATIONS

Lydia Meesters et al., "A Single-Ended Blockiness Measure for JPEG-Coded Images", IPO, Center for Research on User-System Interaction, Signal Processing, 82 (2002) pp. 369-387.

Alan C. Bovik et al., "DCT-Domain Blind Measurement of Blocking Artifacts in DCT-Coded Images", IEEE, 2001, pp. 1725-1728.

Zhou Wang et al., "Blind Measurement of Blocking Artifacts in Images", Laboratory for Image and Video Engineering, Dept. of Electrical and Computer Engineering, University of Texas at Austin, IEEE, 2000.

Par Lindh et al., "Efficient Spatio-Temporal Decomposition for Perceptual Processing of Video Sequences", Signal Processing Laboratory, Swiss Federal Institute of Technology, IEEE, 1996.

Andrew B. Watson et al., "DVQ: A Digital Video Quality Metric Based on Human Vision", Journal of Electronic Imaging 10(1), pp. 20-29, 2001.

Stefan Winkler, "A Perceptual Distortion Metric for Digital Color Video", Signal Processing Laboratory, Swiss Federal Institute of Technology, IEEE, 1999.

Zhenghua Yu et al., "Vision-Model-Based Impairment Metric to Evaluate Blocking Artifacts in Digital Video", Proceedings of the IEEE, vol. 90, No. 1, Jan. 2002, pp. 154-169.

Patrick C. Teo et al., "Perceptual Image Distortion", IEEE, 1994, pp. 982-986.

K.T. Tan et al., "A Multi-Metric Objective Picture-Quality Measurement Model for MPEG Video", IEEE Transactions on Circuits and Systems for Video Technology, vol. 10, No. 7, Oct. 2000, pp. 1208-1213.

Makoto Miyahara et al., "Objective Picture Quality Scale (PQS) for Image Coding", IEEE Transactions on Communications, vol. 46, No. 9, Sep. 1998, pp. 1215-1226.

Shanika A. Karunasekera et al., "A Distortion Measure for Blocking Artifacts in Images Based on Human Visual Sensitivity", IEEE Transactions on Image Processing, vol. 4, No. 6, Jun. 1995, pp. 713-724.

International Telecommunication Union, Telecommunication Standardization Sector, Study Perior 1997-2000, Sep. 1998, Evaluation of New Methods for Objective Testing of Video Quality: Objective Test Plan.

International Organization for Standardization Organisation Internationale Normalisation ISO/IEC JTC 1/SC 29/WG 11, "Coding of Moving Pictures and Audio"., N4240, Sydney, Jul. 2001.

Sequence Listing, Test A (QCIF, 10 Hz, 32kbit) and Test B (QCIF, 15Hz), undated.

Final Report from the Video Quality Experts Group on the Validation of Objective Models of Video Quality Assessment, Mar. 2000, pp. 1-127.

Genista Corporation, Image PQoS Catalog, pp. 1-6, 2003.

Ligang Lu et al., "Full-Reference Video Quality Assessment Consideration Structural Distortion and No-Reference Quality Evaluation of MPEG Video", Multimedia Technologies, IBM T.J. Watson Research Center; Lab for Image and Video Eng., Dept. of ECE, The Univ. of Texas at Austin, IEEE, 2002.

Robert Hooke et al., "Direct Search Solution of Numerical and Statistical Problems", Westinghouse Research Laboratories, Oct. 1960, pp. 212-229.

European Search Report dated Aug. 1, 2008.

Chou, Chun-Hsien et al., "A Perceptually Tuned Subband Image Coder Based on the Measure of Just-Noticeable-Distortion Profile", IEEE Transactions on Circuits and Systems for Video Technology, vol. 5, No. 6, (1995), pp. 467-476.

Van Den Branden Lambrecht, Christian J. et al., "Perceptual Quality Measure Using a Spatio-Temporal Model of the Human Visual System", Proceedings of Spie, vol. 2668, pp. 450-461, XP007905283 ISBN: 978 0 819 42042 8, (1996).

Ong, Eeping, et al., "Method for Objective Video Quality Measurements", Video Standards and Drafts, No. JVT-J024, XP030005801, (2003).

Ong, Eeping, et al., "Video Quality Metric for Low Bitrate Compressed Videos", Image Processing, 2004, ICIP '04. 2004 International Conference on Singapore Oct. 24-27, 2004, IEEE vol. 5, pp. 3531-3534, XP010786560 ISBN: 978-0-7803-8554-2.

\* cited by examiner

| 1 | 1 | 1 | 1 | 1 | 1 | 1 |
|---|---|---|---|---|---|---|
| 1 | 4 | 4 | 4 | 4 | 4 | 1 |
| 1 | 4 | 9 | 9 | 9 | 4 | 1 |
| 1 | 4 | 9 | 0 | 9 | 4 | 1 |
| 1 | 4 | 9 | 9 | 9 | 4 | 1 |
| 1 | 4 | 4 | 4 | 4 | 4 | 1 |
| 1 | 1 | 1 | 1 | 1 | 1 | 1 |

| 0 | 0 | 0 | 0 | 0 | 0 | 0 |
|---|---|---|---|---|---|---|
| 0 | 0 | 0 | 0 | 0 | 0 | 0 |
| 0 | 1 | 4 | 9 | 4 | 1 | 0 |
| 0 | 0 | 0 | 0 | 0 | 0 | 0 |
| 0 | -1 | -4 | -9 | -4 | -1 | 0 |
| 0 | 0 | 0 | 0 | 0 | 0 | 0 |
| 0 | 0 | 0 | 0 | 0 | 0 | 0 |

⸺ 202

| 0 | 0 | 0 | 0 | 1 | 0 | 0 |
|---|---|---|---|---|---|---|
| 0 | 0 | 0 | 4 | 0 | 0 | 0 |
| 0 | 0 | 9 | 0 | 0 | 0 | -1 |
| 0 | 4 | 0 | 0 | 0 | -4 | 0 |
| 1 | 0 | 0 | 0 | -9 | 0 | 0 |
| 0 | 0 | 0 | -4 | 0 | 0 | 0 |
| 0 | 0 | -1 | 0 | 0 | 0 | 0 |

⸺ 204

| 0 | 0 | 1 | 0 | 0 | 0 | 0 |
|---|---|---|---|---|---|---|
| 0 | 0 | 0 | 4 | 0 | 0 | 0 |
| -1 | 0 | 0 | 0 | 9 | 0 | 0 |
| 0 | -4 | 0 | 0 | 0 | 4 | 0 |
| 0 | 0 | -9 | 0 | 0 | 0 | 1 |
| 0 | 0 | 0 | -4 | 0 | 0 | 0 |
| 0 | 0 | 0 | 0 | -1 | 0 | 0 |

⸺ 206

| 0 | 0 | 0 | 0 | 0 | 0 | 0 |
|---|---|---|---|---|---|---|
| 0 | 0 | 1 | 0 | -1 | 0 | 0 |
| 0 | 0 | 4 | 0 | -4 | 0 | 0 |
| 0 | 0 | 9 | 0 | -9 | 0 | 0 |
| 0 | 0 | 4 | 0 | -4 | 0 | 0 |
| 0 | 0 | 1 | 0 | -1 | 0 | 0 |
| 0 | 0 | 0 | 0 | 0 | 0 | 0 |

| 0 | 0.0002 | 0.0011 | 0.0018 | 0.0011 | 0.0002 | 0 |
|---|---|---|---|---|---|---|
| 0.0002 | 0.0029 | 0.0131 | 0.0216 | 0.0131 | 0.0029 | 0.0002 |
| 0.0011 | 0.0131 | 0.0586 | 0.0966 | 0.0586 | 0.0131 | 0.0011 |
| 0.0018 | 0.0216 | 0.0966 | 0.1592 | 0.0966 | 0.0216 | 0.0018 |
| 0.0011 | 0.0131 | 0.0586 | 0.0966 | 0.0586 | 0.0131 | 0.0011 |
| 0.0002 | 0.0029 | 0.0131 | 0.0216 | 0.0131 | 0.0029 | 0.0002 |
| 0 | 0.0002 | 0.0011 | 0.0018 | 0.0011 | 0.0002 | 0 |

METHOD AND SYSTEM FOR VIDEO QUALITY MEASUREMENTS

CROSS REFERENCE TO RELATED APPLICATIONS

This application is a national phase application based on PCT/SG2004/000393, filed Dec. 2, 2004, which claims the benefit of U.S. Provisional Application No. 60/526,249, filed Dec. 2, 2003, the content of both of which is incorporated herein by reference in its entirety.

FIELD OF INVENTION

The present invention relates broadly to a method and system for measuring a quality of a test video stream.

BACKGROUND

In image and video manipulations, apart from on-line and off-line visual quality evaluation, how to gauge distortion also plays a determinative role in shaping most algorithms, such as enhancement, reconstruction, data hiding, compression, and joint source/channel coding. Visual quality control within an encoder and distortion assessment for the decoded signal are particularly of interest due to the widespread applications of H.26x/MPEG-x compression and coding. Since human eyes are the end receiver of most decoded images and video, it is desirable to develop visual quality metrics that correlate better with human eyes' perception than the conventional pixel-wise error (e.g., mean-squared-error (MSE), peak signal-to-noise ratio (PSNR)) measures.

Perceptual models based upon human vision characteristics have been proposed. In one such metric proposal the colour-transformed original and decoded sequences are subjected to blocking and Discrete Cosine Transform (DCT), and the resultant DCT coefficients are then converted to the local contrast, which is defined as the ratio of the AC amplitude to the temporally low-pass filtered DC amplitude. A temporal recursive discrete second-order IIR filtering operation follows to implement the temporal part of the contrast sensitivity function (CSF). The results are then converted to measures of visibility by dividing each coefficient by its respective visual spatial threshold. The difference of two sequences is subjected to a contrast masking operation, and finally the masked difference is pooled over various dimensions to illustrate perceptual error.

With the same paradigm, another approach termed Winkler's metric consists of colour conversion, temporal filters, spatial subband filters, contrast control, and pooling for various channels, which are based on the spatio-temporal mechanisms in the human visual system. The difference of original and decoded video is evaluated to give an estimate of visual quality of the decoded signal. The metric's parameters are determined by fitting the metric's output to the experimental data on human eyes.

Prevalent visual coding schemes (e.g., DCT- or wavelet-based) introduce specific types of artefacts such as blockiness, ringing and blurring. The metrics in such coding may evaluate blocking artefacts as the distortion measure. Other metrics measure five types of error (i.e., low-pass filtered error, Weber's law and CSF corrected error, blocking error, correlated error, and high contrast transitional error), and use Principal Component Analysis to decide the compound effect on visual quality.

Switching between a perceptual model and a blockiness detector depending on the video under test has also been suggested.

Another proposed perceptual distortion metric architecture consists of opponent colour conversion, perceptual decomposition, masking, followed by pooling. In his method, the spatial frequency and orientation-selective filtering and temporal filtering are performed in the frequency (spectral) domain. The behaviour of the human vision system is modelled by cascading a 3-D filter bank and the non-linear transducer that models masking. The filter bank used in one proposed model is separable in spatial and temporal directions. The model features 17 Gabor spatial filters and 2 temporal filters. A non-linear transducer modelling of masking has been utilized. In a simplified version, the perceptual model is applied to blockiness dominant regions.

A software tool for measuring the perceptual quality of digital still images has been provided in the market. Five proprietary full reference perceptual metrics, namely blockiness, blurriness, noise, colourfulness and a mean opinion score have been developed. However, since these methods are proprietary, there are no descriptions available of how these metrics' outputs are being calculated.

A full reference video quality metric has also been proposed. For each frame, corresponding local areas are extracted from both the original and test video sequences respectively. For each selected local area, statistical features such as mean and variance are calculated and used to classify the local area into smooth, edge, or texture region. Next a local correlation quality index value is calculated and these local measures are averaged to give a quality value of the entire frame. The frame quality value is adjusted by two factors: the blockiness factor and motion factor. The blockiness measurement is evaluated in the power spectrum of the image signal. This blockiness measure is used to adjust the overall quality value only if the frame has relatively high quality index value but severe blockiness. The motion measurement is obtained by a simple block-based motion estimation algorithm. This motion adjustment is applied only if a frame simultaneously satisfies the conditions of low quality index value, high blurriness and low blockiness. Finally, all frame quality index values are averaged to a single overall quality value of the test sequence.

SUMMARY

In accordance with a first aspect of the present invention there is provided a method of measuring a quality of a test video stream, the method comprising measuring a content richness fidelity feature of the test video stream based on occurrences of color values in image frames of the test video stream; measuring a block-fidelity feature of the test video stream based on distortion at block-boundaries in the image frames of the test video stream; measuring a distortion-invisibility feature of the test video stream based on distortion at pixels of the image frames of the test video stream; and determining a quality rating for the test video stream based on the content richness fidelity feature, the block-fidelity feature and the distortion-invisibility feature measured.

The measuring of the content richness fidelity feature of the test video stream may be based on a sum of products for each colour and each frame, wherein each product comprises the product of a probability of occurrence of said each colour in said each image frame, and a logarithmic of said probability.

The measuring of the block-fidelity feature of the test video stream may be based on distortion at 4-pixel sub-block boundaries.

The measuring of the content richness fidelity feature may be based on occurrences of color values in corresponding image frames of the test video stream and an original video stream from which the test video stream has been derived.

The measuring of the block-fidelity feature of the test video stream may be based on distortion at block-boundaries in corresponding image frames of the test video stream and the original video stream from which the test video stream has been derived.

The measuring of the distortion-invisibility feature of the test video stream may be based on a visibility threshold value.

The visibility threshold value may be based on one or more masking effects determined for the test video stream and the original video stream.

The masking effects may comprise one or more of a group consisting of colour masking, temporal masking and spatial-textural masking.

The measuring of the distortion-invisibility feature of the test video stream is based on distortion at pixels of corresponding image frames of the test video stream and the original video stream from which the test video stream has been derived.

The measuring of the distortion-invisibility feature of the test video stream is based on processing of current and previous image frames of the test video stream and the original video stream.

In accordance with a second aspect of the present invention there is provided a system for measuring a quality of a test video stream, the system comprising means for measuring a content richness fidelity feature of the test video stream based on occurrences of color values in image frames of the test video stream; means for measuring a block-fidelity feature of the test video stream based on distortion at block-boundaries in the image frames of the test video stream; means for measuring a distortion-invisibility feature of the test video stream based on distortion at pixels of the image frames of the test video stream; and means for determining a quality rating for the test video stream based on the content richness fidelity feature, the block-fidelity feature and the distortion-invisibility feature measured.

In accordance with a third aspect of the present invention there is provided a system for measuring a quality of a test video stream, the system comprising a color processor measuring a content richness fidelity feature of the test video stream based on occurrences of color values in image frames of the test video stream; a distortion processor measuring a block-fidelity feature of the test video stream based on distortion at block-boundaries in the image frames of the test video stream and measuring a distortion-invisibility feature of the test video stream based on distortion at pixels of the image frames of the test video stream; and a quality rating processor determining a quality rating for the test video stream based on the content richness fidelity feature, the block-fidelity feature and the distortion-invisibility feature measured.

In accordance with a fourth aspect of the present invention there is provided a computer readable data storage medium having stored thereon program code means for instructing a computer to execute a method of measuring a quality of a test video stream, the method comprising measuring a content richness fidelity feature of the test video stream based on occurrences of color values in image frames of the test video stream; measuring a block-fidelity feature of the test video stream based on distortion at block-boundaries in the image frames of the test video stream; measuring a distortion-invisibility feature of the test video stream based on distortion at pixels of the image frames of the test video stream; and determining a quality rating for the test video stream based on the content richness fidelity feature, the block-fidelity feature and the distortion-invisibility feature measured.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The example embodiment described comprises an objective video quality measurement method to automatically measure the perceived quality of a stream of video images. The method is based on a combined measure of distortion-invisibility, block-fidelity, and content richness fidelity.

The example embodiment seeks to provide an automatic and objective video quality measurement method that is able to emulate the human vision to detect the perceived quality of a video stream. Traditionally, video quality is performed via a subjective test where a large number of human subjects are used to gauge the quality of a video but this process is not only time-consuming, but tedious and expensive to perform. The example embodiments seek to replace the need of a subjective test in order to be able to gauge the perceived quality of a video stream.

Generally, the example embodiment consists of computation of a video quality rating using a video quality model made up of the following components: (1) content richness fidelity ($F_{RF}$), (2) block-fidelity ($F_{BF}$), and (3) distortion-invisibility (D).

The content richness fidelity feature measures the fidelity of the richness of a test video's content with respect to the original (undistorted) reference video. This content richness fidelity feature gives higher values for a test video which has better fidelity in content richness with respect to the original (undistorted) reference video.

The block-fidelity feature measures the amount of distortion at block-boundaries in the test video when compared with respect to the original (undistorted) reference video. The block-fidelity feature should give lower values when distortion at block-boundaries in the test video is more severe and higher values when distortion is very low or does not exist in the test video (when compared to the original (undistorted) reference video).

The distortion-invisibility feature measures the average amount of distortion that may be visible at each pixel with respect to a visibility threshold and gives higher values for lower visible distortions and lower values for higher visible distortions.

A combined measure is proposed and then demonstrated to measure visual quality for video With the video-quality features in the example embodiment.

Content Richness Fidelity

The content richness fidelity feature of the example embodiment measures the fidelity of the richness of test video's content with respect to the original reference (undistorted) video. This content richness fidelity feature gives higher values for test video which has better fidelity in content richness with respect to the original reference (undistorted) video. This feature closely correlates with human perceptual response which tends to assign better subjective ratings to more lively and more colourful images and lower subjective ratings to dull and unlively images.

The image content richness fidelity feature for each individual frame of time interval t of the video can be defined as $$F_{RF}(t) = e^{(0.25)R_d(t)/R_o(t)}, \text{ and}$$

$$R(t) = -\sum_{p(i) \neq 0} p(i) \log_e(p(i)),$$

where the subscript o refers to the original video sequence, the subscript d refers to the test video sequence, $t \in [1,n]$, n is the total number of image-frames in the video sequence, and:

$$p(i) = \frac{N(i)}{\sum_{\forall i} N(i)}.$$

Here, i is a particular colour (either the luminance or the chrominance) value, $i \in [0,255]$, N(i) is the number of occurrence of i in the image frame, and p(i) is the probability or relative frequency of i appearing in the image frame.

Figure 5:
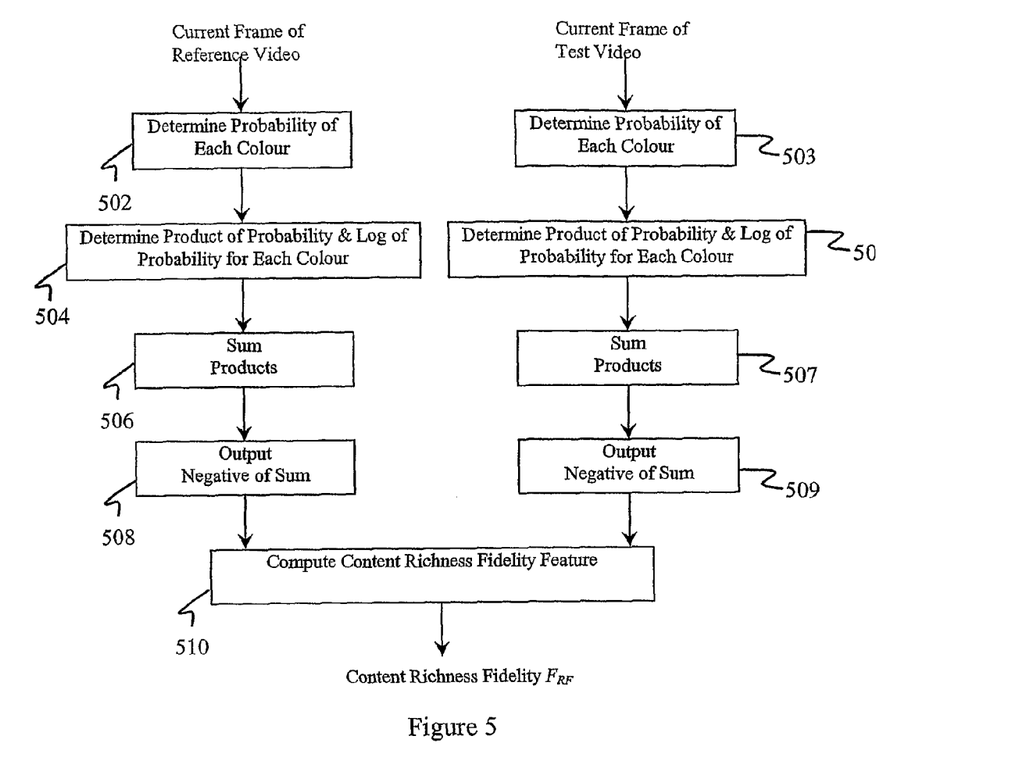
FIG. 5 is a flow-chart illustrating the computing of the content richness fidelity in an example embodiment.

FIG. 5 shows a flow chart of the process involved in computing the content richness fidelity in the example embodiment. At steps 502 and 503, the probability of each colour is determined for the current frame of a reference video and of a test video respectively.

At steps 504 and 505, the product of the probability and the Log of probability for each colour is determined for the reference video and test video respectively.

At steps 506 and 507, the products are summed for the reference video and the test video respectively.

At steps 508 and 509, the negative of the summed products is output for the reference video and the test video respectively.

At step 510, the content richness fidelity feature is computed and output.

Block-Fidelity

The block-fidelity feature of the example embodiment measures the amount of distortion at block-boundaries in the test video when compared with respect to the original reference (undistorted) video. The block-fidelity feature should give lower values when distortion at block-boundaries in the test video is more severe and higher values when distortion is very low or does not exist in the test video (when compared to the original reference (undistorted) video).

The blocking effect, and its propagation through reconstructed video sequences, is one of the significant coding artefacts that often occur in video compression. The blocking effect is also a source of a number of other types of reconstruction artifacts, such as stationary area granular noise.

The block-fidelity measure for each individual frame of the video is defined as follows:

$$F_{BF}(t) = e^{(0.25)\{(B_d^h(t)+B_d^v(t))-(B_o^h(t)+B_o^v(t))\}/(B_o^h(t)+B_o^v(t))},$$

where the subscript o refers to the original video sequence, d refers to the test video sequence, and:

$$B^h(t) = \frac{1}{H(\lfloor W/4 \rfloor - 1)} \sum_{y=1}^{H} \sum_{x=1}^{\lfloor W/4 \rfloor - 1} |d^h(4x, y, t)|, \text{ and}$$

$$d^h(x, y, t) = I(x+1, y, t) - I(x, y, t).$$

I(x,y,t) denotes the colour value of the input image frame I at pixel location (x,y) and time interval t, H is the height of the image, W is the width of the image, and where $x \in [1,W]$ and $y \in [1,H]$.

Similarly, $$B^v(t) = \frac{1}{W(\lfloor H/4 \rfloor - 1)} \sum_{y=1}^{\lfloor H/4 \rfloor - 1} \sum_{x=1}^{W} |d^v(x, 4y, t)|, \text{ and}$$

$$d^v(x, y, t) = I(x, y+1, t) - I(x, y, t).$$

Literally, $B^h$ and $B^v$ are computed from block boundaries interspaced at 4 pixels apart in horizontal and vertical directions respectively.

Figure 4:
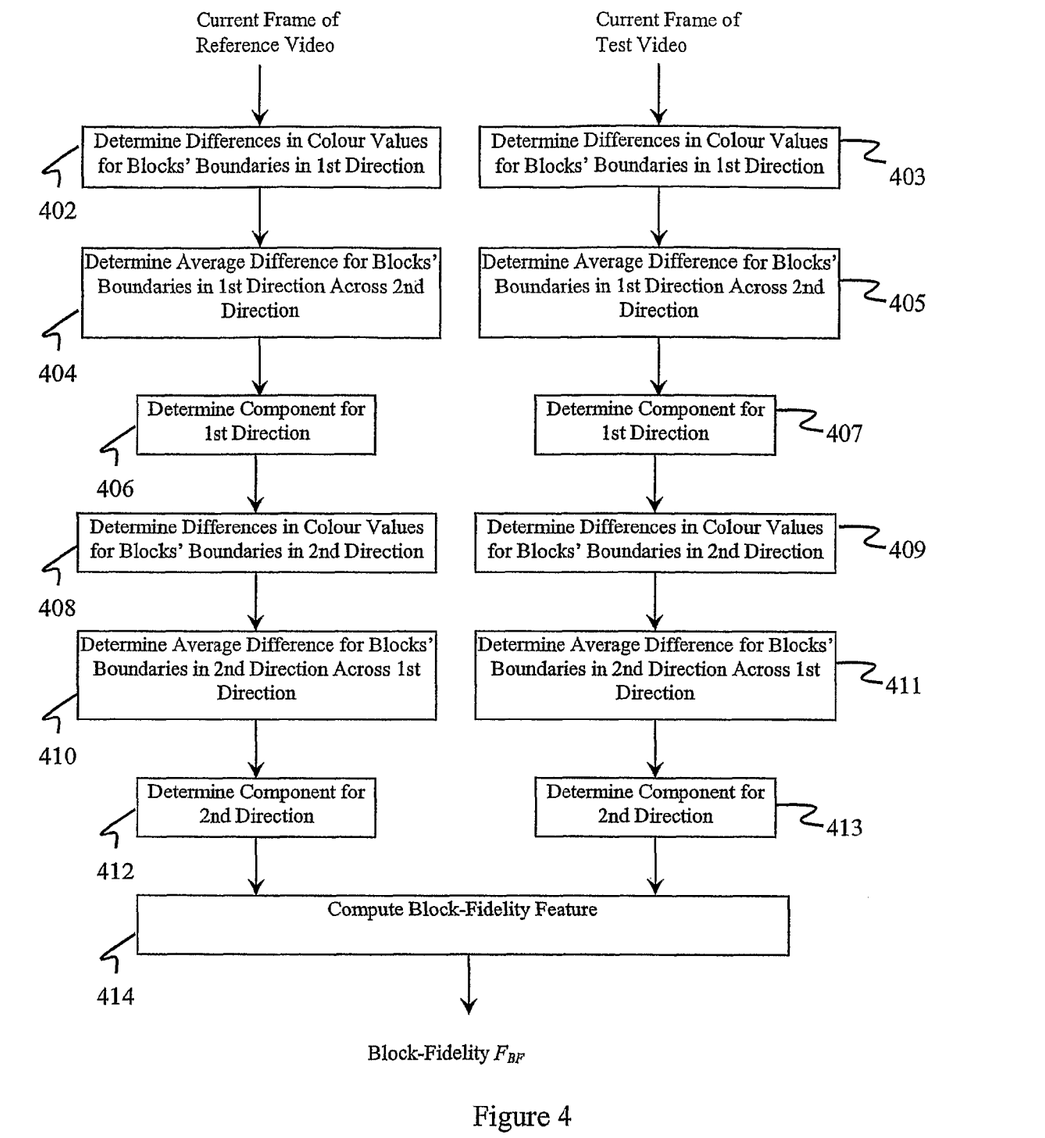
FIG. 4 is a flow-chart illustrating the computing of the block-fidelity feature in an example embodiment.

FIG. 4 shows a flow chart of computing the block-fidelity feature in the example embodiment. At steps 402 and 403 the differences in colour values for blocks' boundaries in a first direction are determined for a current frame of the reference video and the test video respectively. At steps 404 and 405 an average difference for blocks' boundaries in the first direction across a second direction is determined for the reference video and the test video respectively. At steps 406 and 407, a component for the first direction is determined for the reference video and the test video respectively.

At steps 408 and 409, differences in colour values for blocks' boundaries in the second direction are determined for the reference video and the test video respectively. At steps 410 and 411, an average difference for blocks' boundaries in the second direction across the first direction is determined for the reference video and the test video respectively. At steps 412 and 413, a component for the second direction is determined for the reference video and the test video respectively. At step 414, the block-fidelity feature is computed and output.

Distortion-Invisibility

The distortion-invisibility feature in the example embodiment measures the average amount of distortion that may be visible at each pixel with respect to a visibility threshold and gives higher values for lower visible distortions and lower values for higher visible distortions. The distortion-invisibility measure, D(t), for each frame of the video is given by:

$$D(t) = \left\{ 1 \bigg/ \frac{1}{WH} \sum_{x=1}^{W} \sum_{y=1}^{H} \left[ \gamma_1 + \frac{\hat{d}(x, y, t)}{\gamma_2 + T(x, y, t)} \right] \right\}$$

T(x,y,t) is the visibility threshold at a particular pixel location (x,y) and time interval t, W and H are width and height of the video frame respectively, $1 \leq x \leq W$, $1 \leq y \leq H$, $\gamma_1$ is included for introducing linearity into the equation, and $\gamma_2$ prevents division by zero in the equation.

Also:

$$\hat{d}(x, y, t) = \begin{cases} d(x, y, t) & \text{if } d(x, y, t) \geq T(x, y, t) \\ 0 & \text{otherwise} \end{cases}$$

where d(x,y,t) is the difference between a frame in the test video $I_d$ and the reference video $I_o$ at the same pixel location (x,y) and time t and is defined as:

$$d(x,y,t) = |I_o(x,y,t) - I_d(x,y,t)|$$

Here, $I_o(x,y,t)$ denotes a pixel at location (x,y) at frame t of the original video sequence while $I_d(x,y,t)$ denotes a pixel at location (x,y) at frame t of the test video sequence.

The visibility threshold T is given by:

$$T(x,y,t) = (T^l(x,y,t) + T^s(x,y,t) - C^{ls} \cdot \min\{T^l(x,y,t), T^s(x,y,t)\}) T^m(x,y,t)$$

The visibility threshold at a particular pixel located at position (x,y) and time t, denoted T(x,y,t), provides an indication of the maximum allowable distortions at a particular pixel in the image frame which will still not be visible to human eyes. Here, $T^l(x,y,t)$, $T^s(x,y,t)$ and $T^m(x,y,t)$ can be regarded as effects due to colour masking, spatial-textural masking, and temporal masking respectively at a particular pixel located at position (x,y) in the image frame at time interval t in the video sequence, while $C^{ls}$ is a constant. The three masking effects interact in a manner as described by the above equation in order to provide a visibility threshold required for this objective video quality measurement method. Literary, visibility threshold is made up of additive-cum-weak-cancellation interactions of both the colour masking term $T^l$ and the spatial-textural masking term $T^s$ (mathematically expressed as $T^l(x,y,t) + T^s(x,y,t) - C^{ls} \cdot \min\{T^l(x,y,t), T^s(x,y,t)\}$), followed by a multiplicative interaction with the temporal masking term $T^m$.

Masking is an important visual phenomenon and can explain why similar artifacts are disturbing in certain regions (such as flat regions) of an image frame while they are hardly noticeable in other regions (such as textured regions). In addition, similar artifacts in certain regions of different video sequences displaying different temporal characteristics will appear as disturbing in a particular video sequence but not in another. In the example embodiment, these visual phenomenon have been modelled using colour masking, spatial-textural masking, and temporal masking which will be further described in the below section.

The temporal masking $T^m$ attempts to emulate the effect of human vision's characteristic of being able to accept higher video-frame distortion due to larger temporal changes and can be derived as follow:

$$T^m(x, y, t) = $$

$$e^{f_s \cdot f_r} \begin{cases} T_2^m & \text{if } |d_f(x, y, t)| \leq T_3^m \\ T_1^m \left( z_2^{(1-((L_m - d_f(x,y,t))/(L_m - T_3^m)))} - 1 \right) + T_2^m & \text{if } d_f(x, y, t) < -T_3^m \\ T_o^m \left( z_1^{(1-((L_m - d_f(x,y,t))/(L_m - T_3^m)))} - 1 \right) + T_2^m & \text{Otherwise} \end{cases}$$

where $d_f(x,y,t)$ is the inter-frame difference at a particular pixel location (x,y) in time t between a current frame $I_o(x,y,t)$ and a previous coded frame $I_o(x,y,t-f_s/fr)$ (assuming that frames that have been coded at below full frame rate have been repeated in this video sequence) and is mathematically expressed as:

$$d_f(x,y,t) = I_o(x,y,t) - I_o(x,y,t-f_s/f_r)$$

Here, $f_r$ is the frame rate at which the video has been compressed, $f_s$ is the full frame rate, $f_s$ is a scaling factor, while $L_m$, $T_o^m$, $T_1^m$, $T_2^m$, $T_3^m$, $z_1$, and $z_2$ are constants used to determine the exact profile of the temporal masking.

The colour masking attempts to emulate the effect of human vision's characteristic of being able to accept higher video-frame distortion when the background colour is above or below a certain mid-level threshold and can be derived as follow:

$$T^l(x, y, t) = $$

$$\begin{cases} T_1^l \left( v_2^{(1-((\lfloor L_l/2 \rfloor + b(x,y,t))/(L_l - r)))} - 1 \right) + T_2^l & \text{if } b(x, y, t) \leq (L_l - r) \\ T_o^l \left( v_1^{(1-((\lfloor 3L_l/2 \rfloor - b(x,y,t))/(L_l - r)))} - 1 \right) + T_2^l & \text{if } b(x, y, t) > (L_l + r) \cdot \\ T_2^l & \text{Otherwise} \end{cases}$$

Here, $T_o^l$, $T_1^l$ and $T_2^l$, $L_l$, r, $v_1$, and $V_2$ are constants used to determine the exact profile of the colour masking.

The spatial-textural masking attempts to emulate the effect of human vision's characteristic of being able to accept higher video-frame distortion when the particular point has richer texture or spatial profile and can be derived as follow:

$$T^s(x,y,t) = (m(x,y,t)b(x,y,t)\alpha_1 + m(x,y,t)\alpha_2 + b(x,y,t)\alpha_3 + \alpha_4)W(x,y,t).$$

Here, $\alpha_1$, $\alpha_2$, $\alpha_3$, and $\alpha_4$ are constants used to determine the exact profile of the spatial-textural masking.

In the spatial-textural masking, m(x,y,t) is the average of the average colour value $g_k(x,y)$ in four different orientations and it attempts to capture the textural characteristic of the small local region centred on pixel (x,y,t) and can be mathematically written as:

$$m(x, y, t) = \frac{1}{4}\sum_{k=1}^{4} |g_k(x, y, t)|.$$

Also, $g_k(x,y,t)$ is the average colour value around a pixel located at position (x,y) of a frame in the original reference video sequence at time interval t and is computed by convolving a 7×7 mask, $G_k$ with this particular frame in the original reference video sequence. Mathematically, $g_k(x,y,t)$ can be expressed as:

$$g_k(x, y, t) = \frac{1}{19} \sum_{m=-3}^{3} \sum_{n=-3}^{3} I_o(x+m, y+n, t) \cdot G_k(m+4, n+4, t).$$

Figure 2:
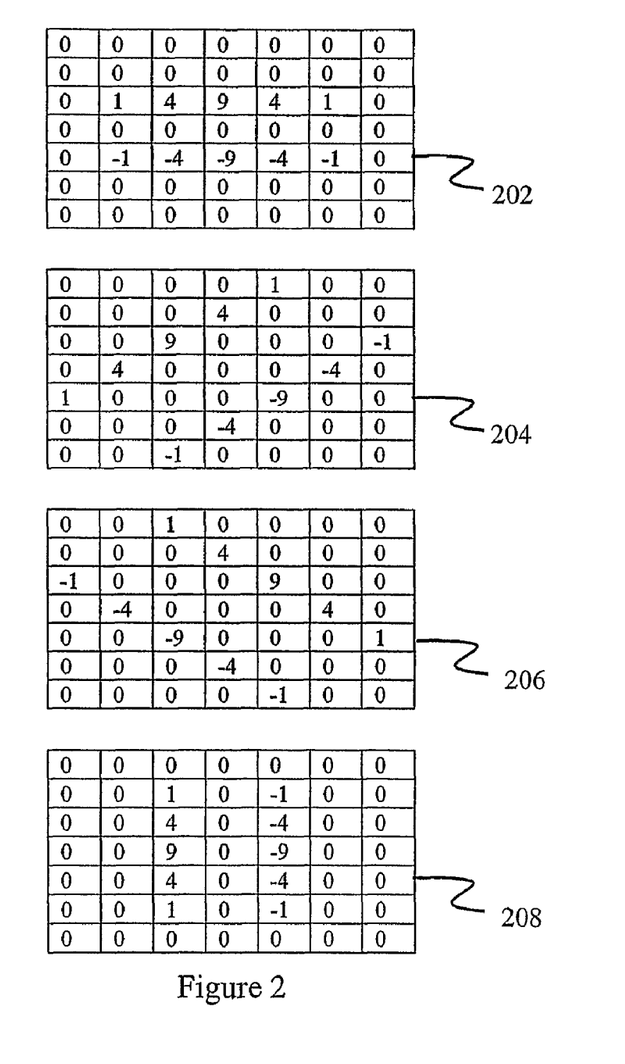
FIG. 2 is a schematic drawing illustrating 7×7 masks utilised in calculating the average luminance around a pixel, according to an example embodiment.

The four 7×7 masks, $G_k$, for k={1,2,3,4}, shown in FIG. 2 at numerals 202, 204, 206 and 208 respectively, are four differently oriented gradient masks used to capture the strength of the gradients around a pixel located at position (x,y,t).

Figure 1:
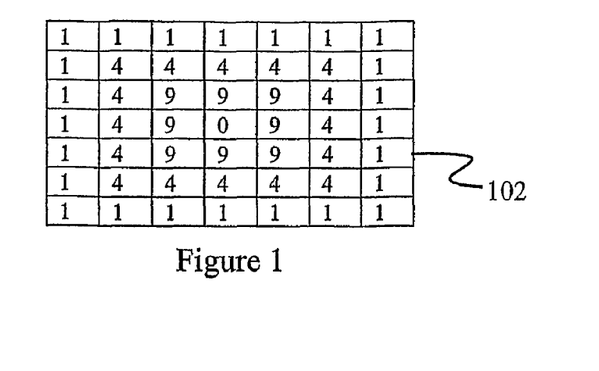
FIG. 1 is a schematic drawing illustrating a 7×7 mask utilised in determining the average background luminance around a pixel, in accordance with an example embodiment.

Here, b(x,y,t) is the average background colour value around a pixel located at position (x,y) of a frame in the original reference video sequence at time interval t and is computed by convolving a 7×7 mask, B, shown in FIG. 1 at numeral 102, with this particular frame in the original reference video sequence. Mathematically, b(x,y,t) can be expressed as:

$$b(x, y, t) = \frac{1}{40} \sum_{m=-3}^{3} \sum_{n=-3}^{3} f(x+m, y+n, t) \cdot B(m+4, n+4, t).$$

The 7×7 mask, B, acts like a low-pass filter when operated on a pixel located at position (x,y,t).

Figure 3:
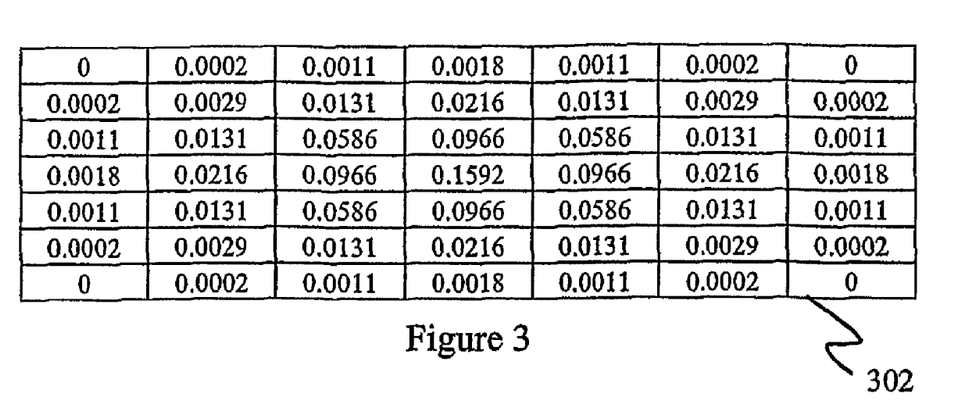
FIG. 3 is a schematic drawing illustrating a 7×7 low-pass filter utilised in reducing the spatial-textural masking at edge locations, in accordance with an example embodiment.

In addition, W(x,y,t) is an edge-adaptive weight of the pixel at location (x,y) of a frame in the original reference video sequence at time interval t, and it attempts to reduce the spatial-textural masking at edge locations because artifacts that are found on essential edge locations tend to reduce the visual quality of the image frame. The corresponding edge-adaptive weight matrix W, obtained by convolving $\hat{E}$ with a 7×7 low-pass filter g shown in FIG. 3 at numeral 302, is given by:

$$W = \hat{E} * g$$

$$\hat{E} = 1 - (0.9E)$$

where * is a convolution operator, E is the edge matrix of the original image frame computed with any edge detection technique and contains values of 1 and 0 for edge and non-edge pixels respectively.

Figure 6:
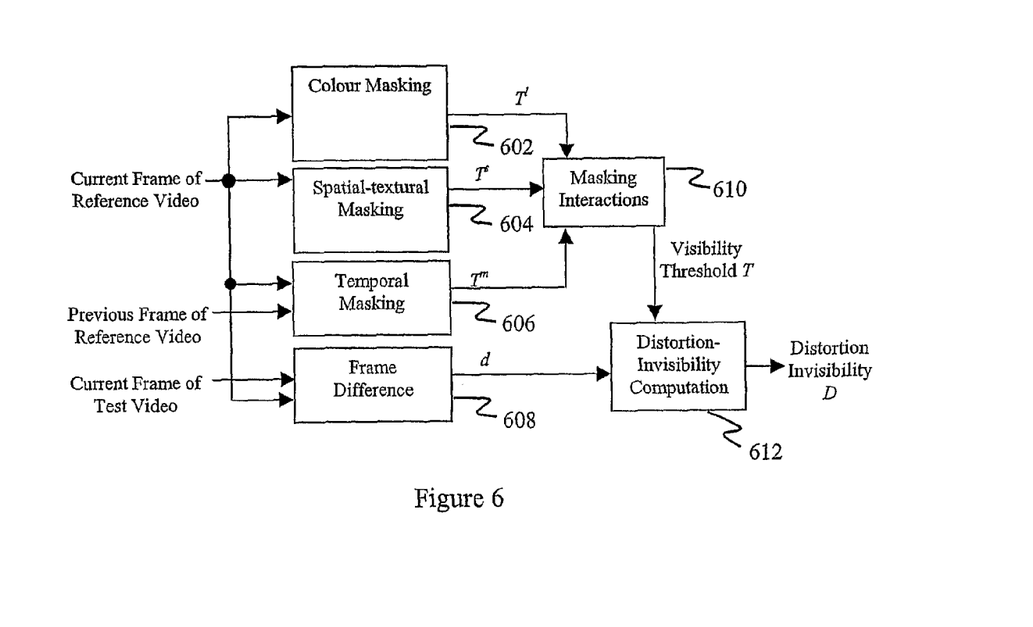
FIG. 6 is a flow-chart illustrating the process for computing distortion-invisibility in an example embodiment.

FIG. 6 shows a flow chart illustrating the process for computing distortion-invisibility in the example embodiment. At steps 602 and 604, colour masking and spatial-textural masking respectively are performed on the current frame of the reference video. At step 606, temporal masking is performed between the current frame of the reference video and the previous frame of the reference video. At step 608, a frame difference is determined between the current frame of the test video and the current frame of the reference video.

At step 610, masking interactions are performed based on $T^1$, $T^s$, and $T^m$ from steps 602, 604, and 606 to produce a visibility threshold T. At step 612, the distortion-invisibility D is computed based on an output from the masking interactions step 610 and d from the frame difference determination step 608, and the distortion-invisibility D is output.

Video Quality Measurement Method

The overall objective video quality rating in the example embodiment for a video sequence, Q, is given by averaging the objective video quality rating for each frame q(t) and can be expressed as:

$$Q = \sum_{t=i \cdot (f_f/f_r)}^{n} [q(t)]/n_t, i = 1, 2, \ldots$$

where n is the total number of frames in the original video sequence, $n_t$ is the total number of coded video sequences (which is different if the video is coded at below the full frame rate) and is given by:

$$n_t = n/(f_f/f_r),$$

and q(t) is the objective video quality rating for each frame, defined as follows:

$$q(t) = D(t) \cdot F_{BF}(t) \cdot F_{RF}(t).$$

Figure 7:
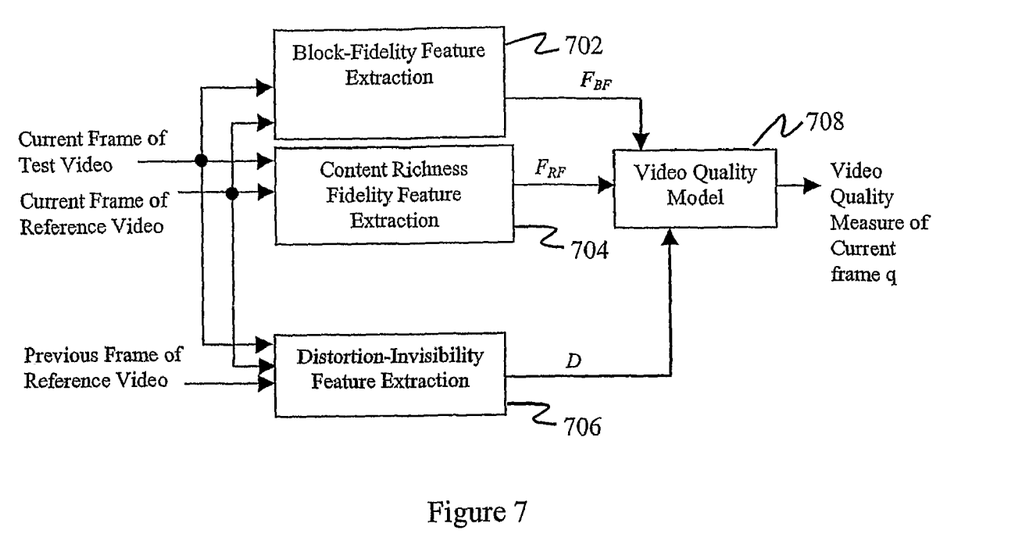
FIG. 7 is a schematic drawing of a video quality measurement system, according to an example embodiment.

FIG. 7 shows a block diagram of the video quality measurement system 700 of the example embodiment. The system 700 comprises a block-fidelity feature extraction module 702, a content richness fidelity feature extraction module 704, a distortion-invisibility feature extraction module 706, and a video quality model module 708. The current frame of the test video is input to each of the modules 702, 704 and 706. The current frame of the reference video is input to each of the modules 702, 704 and 706. The previous frame of the reference video is input to module 206.

In video quality module 208, a video quality measure of the current frame is generated and output, based on the respective outputs of modules 702, 704 and 706.

For colour video sequences, the overall objective video rating for a colour video sequence, $Q_c$, is given by a weighted averaging of the objective video quality rating for each colour's $q_j(t)$, for j=1, ..., a, where a is the maximum number of colour components, and can be expressed as:

$$Q_c = \sum_{j=1}^{a} \alpha_j \left( \sum_{t=i \cdot (f_f/f_r)}^{n} [q_j(t)]/n_t \right), i = 1, 2, \ldots$$

where $\alpha_j$ denotes the weightage for each colour components.

Figure 8:
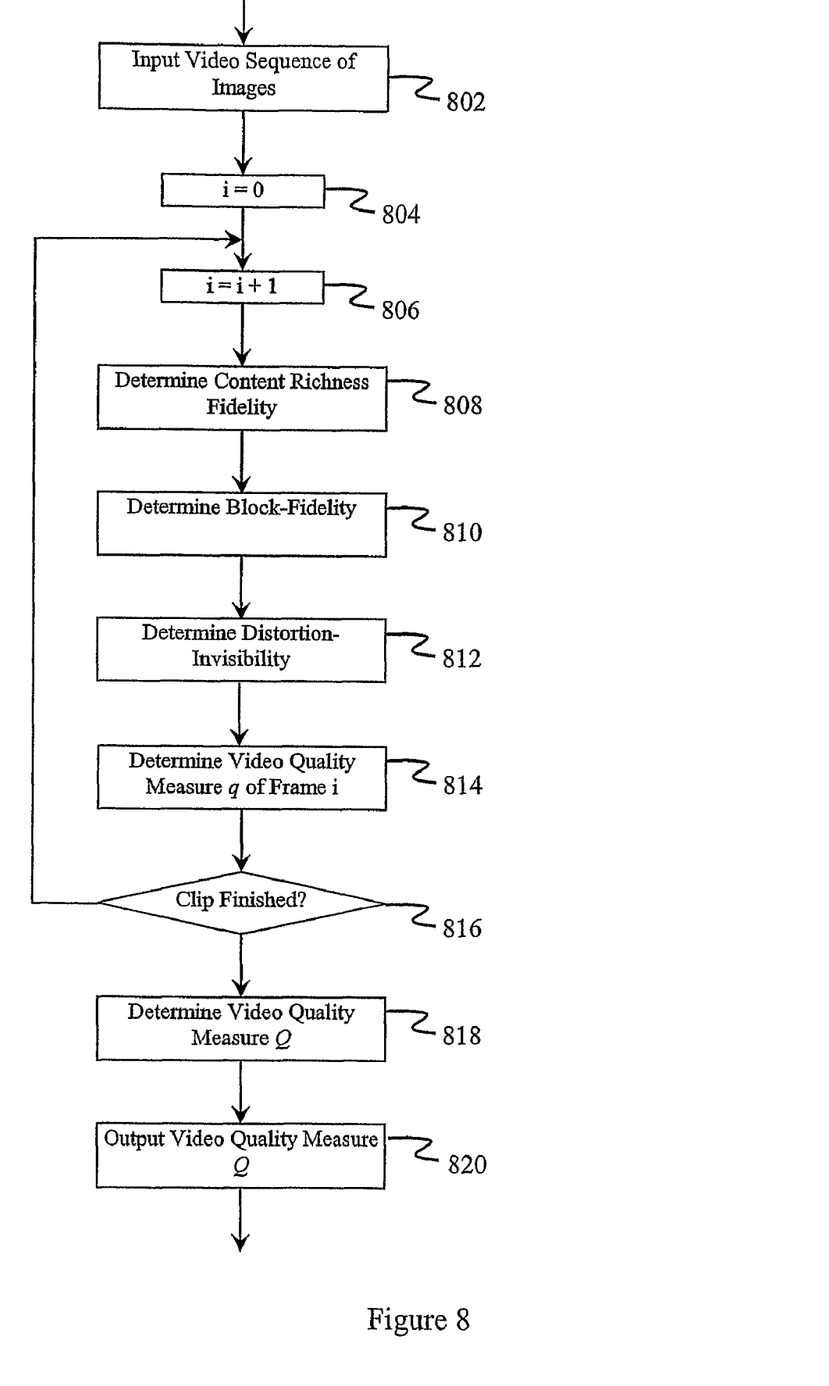
FIG. 8 is a flow-chart illustrating the process for computing the overall video quality measure in an example embodiment.

FIG. 8 shows a flow chart illustrating the process for computing the overall video quality measure for a test video sequence in the example embodiment. At step 802, the test video sequence of images is input. At step 804, a counter i is set to zero. At step 806, the counter i is incremented by one. At step 808, the content richness fidelity is determined as previously described with reference to FIG. 5. At step 810, the block-fidelity is determined as previously described with reference to FIG. 4. At step 812, the distortion-invisibility is determined as previously described with reference to FIG. 6. At step 814, the video quality measure is determined for frame i, as previously described with reference to FIG. 7.

At step 816, it is determined whether or not the input video sequence or clip has finished. If not, the process loops back to step 806. If the clip has finished, the video quality measure Q is determined for the clip at step 818, and output at step 820.

Metric Parameterization

This step is used to derive the values of the various parameters being used in the video quality measurement model in the example embodiment.

Parameters Optimization Method

The parameters of the video quality measurement model in the example embodiment have been obtained by optimising them with respect to their correlation with human visual subjective ratings.

The parameters' optimization method used is a modified version of the Hooke & Jeeves' pattern search method, due to its robustness, simplicity and efficiency. Reference is made to Hooke R., Jeeves T. A., "Direct Search" solution of numerical and statistical problems, *Journal of the Associate Computing Machinery*, Vol. 8, 1961, pp. 212-229. The algorithm performs well in curve fitting and linear equations solving and has been successfully applied to many applications.

Application of Pattern Search Strategy

Hooke & Jeeve's method has been used here due to its use of simple strategy rather than complex tactics. It makes two types of move: exploratory moves and pattern moves. Each point with success is termed as base point. So the process proceeds from base point to base point.

An exploratory move is designed to acquire knowledge concerning the local behaviour of the objective function. This knowledge is inferred entirely from the success or failure of the exploratory moves and utilized by combining it into a 'pattern', which indicates a probable direction for a successful move. For simplicity, the exploratory moves here are taken to be simple, that is, at each move only the value of a single coordinate is changed. From a base point, a pattern move is designed to utilize the information acquired in the previous exploratory moves, and accomplish the minimization of the objective function by moving in the direction of the established 'pattern'. On the intuitive basis, the pattern move from the base point duplicates the combined moves from the previous base point. A sequence of exploratory moves then follows and may result in a success or a failure.

In the case of a success, the final point reached becomes a new base point and a further pattern is conducted. The length of the pattern move may reach many times of the size of the base step.

In the case of failure, the pattern move is abandoned. From the base point, another series of exploratory moves are made in order to establish an entirely new pattern.

For any given value of step size, the search will reach an impasse when no more new base point is found. The step size can be reduced to continue the search but should be kept above a practical limit imposed by the application. The exploratory moves will be stopped when the step size is sufficiently small, and the final termination of the search is made when no more base point to be found, or the optimization result is good enough.

Parameters Optimization Based on Subjective Ratings

The parameters of the video quality measurement model in the example embodiment have been obtained by optimising them with respect to their correlation with human visual subjective ratings. The correlation measure used in the optimisation is selected to be Pearson correlation of the logistic fit. Table 1 summarizes the test conditions for the original video sequences. Each of the video sequences consists of 250 frames.

TABLE 1

Test Conditions for original video sequences

| Bit Rate | Frame rate | | |
|---|---|---|---|
| | 7.5 fps | 15 fps | 30 fps |
| 24 Kbps | QCIF | QCIF | — |
| 48 Kbps | QCIF | QCIF | QCIF |
| 64 Kbps | Both QCIF and CIF | Both QCIF and CIF | QCIF |
| 128 Kbps | CIF | CIF | Both QCIF and CIF |
| 384 Kbps | — | — | CIF |

Here, only the QCIF (Quarter Common Intermediate Format) video sequences have been used for obtaining the required optimised parameters of the video quality measurement model and in addition, only decoded frames interspaced at 4 frames interval are being used for the optimisation process in order to reduce the amount of data used for training and speed up the optimisation process. After the required parameters have been obtained using the above-mentioned Hooke and Jeeve's parameters search method, the video quality measurement method is tested on all the image frames of the 90 test video sequences in the test data set.

To speed up the optimisation process, a 2-step optimisation process has been utilized here. In the first step, the parameters of visibility threshold, luminance and spatial-textural masking, namely $C^{ts}$, $f_s$, $T_o^m$, $T_1^m$, $T_2^m$, $T_3^m$, $Z_1$, $Z_2$, $\alpha_1$, $\alpha_2$, $\alpha_3$, and $\alpha_4$ have been optimised. In the second step, the temporal masking parameters, namely $T_o^t$, $T_1^t$ and $T_2^t$, r, $v_1$, and $v_2$ are then optimised (using the already optimised parameters obtained in the first step). Finally, the above process is repeated again to ensure that the final optimised parameters estimated are indeed the best parameters obtainable.

The video quality measurement method in the example embodiment has been tested on the test data set consisting of 90 video sequences that have been obtained by subjecting 12 original video sequences to various compression bitrates and frame rates (see Table 1). The performance of the proposed metric is measured with respect to the subjective ratings of these test video sequences that have been obtained by subjective video quality experiment.

As mentioned before, the test video sequences are generated by subjecting 12 different original undistorted CIF (Common Intermediate Format) and QCIF (Quarter Common Intermediate Format) video sequences ("Container", "Coast Guard", "Japan League", "Foreman", "News", and "Tempete") to H.26L video compression with different bit rates and frame rates.

Table 2 shows the results of the proposed method with respect to PSNR. The upper bound and lower bound of Pearson correlation were obtained with a confidence interval of 95%.

TABLE 2

Results of video quality measurement method of the example embodiment and that given by PSNR

| | Pearson-Correlation | Upper Bound | Lower Bound | Spearman-Correlation |
|---|---|---|---|---|
| PSNR | 0.701 | 0.793 | 0.578 | 0.676 |
| Example embodiment | 0.897 | 0.931 | 0.848 | 0.902 |

Figure 9:
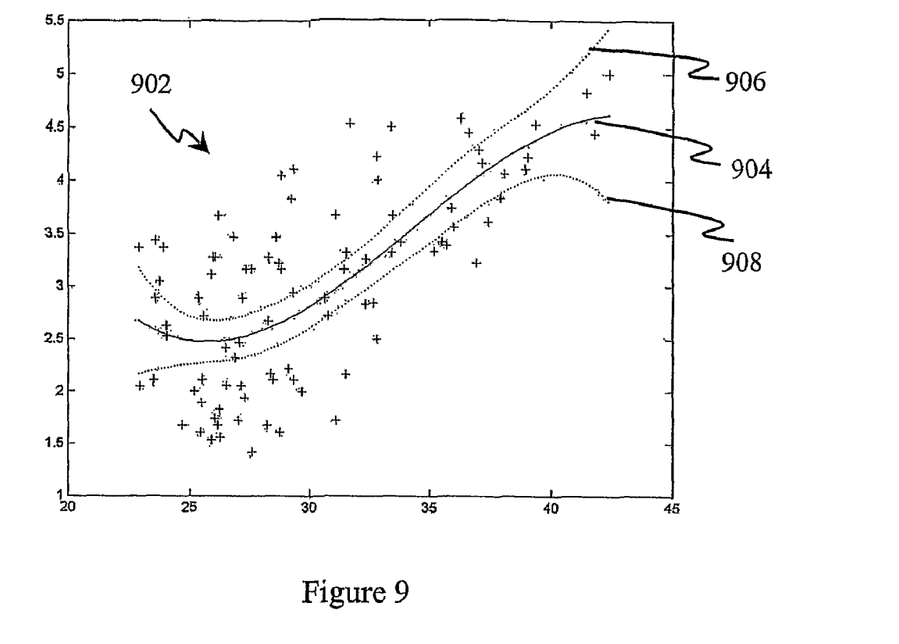
FIG. 9 shows a scatterplot of subjective ratings versus ratings obtained using a prior art visual quality metrics.
Figure 10:
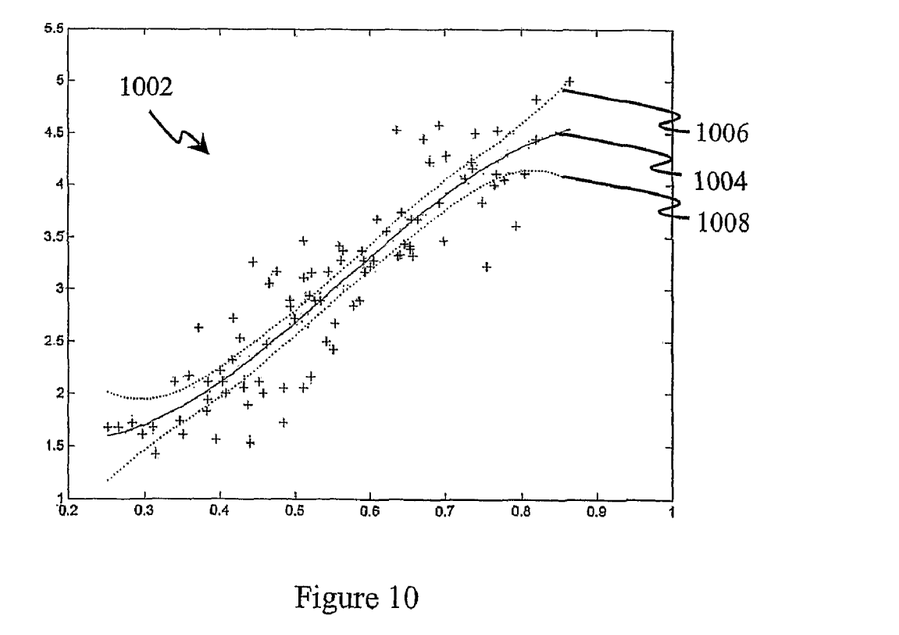
FIG. 10 shows a scatterplot of subjective ratings versus the video quality ratings obtained in accordance with an example embodiment.

FIG. 9 shows the scatterplot 902 of subjective ratings (y-axis) versus the rating values obtain using a prior art visual quality metric, more particular PSNR values (x-axis), while FIG. 10 shows the scatterplot of subjective ratings (y-axis) versus the video quality ratings (x-axis) estimated utilising the video quality measurement method of an example embodiment of the present invention.

In FIGS. 9 and 10, the middle solid lines (904, 1004) portrays the logistic fit using the above-mentioned 4-parameter cubic polynomial, while the upper dotted curves (906, 1006) and the lower dotted curves (908, 1008) portray the upper bound and lower bound respectively obtained with a confidence interval of 95%.

Figure 11:
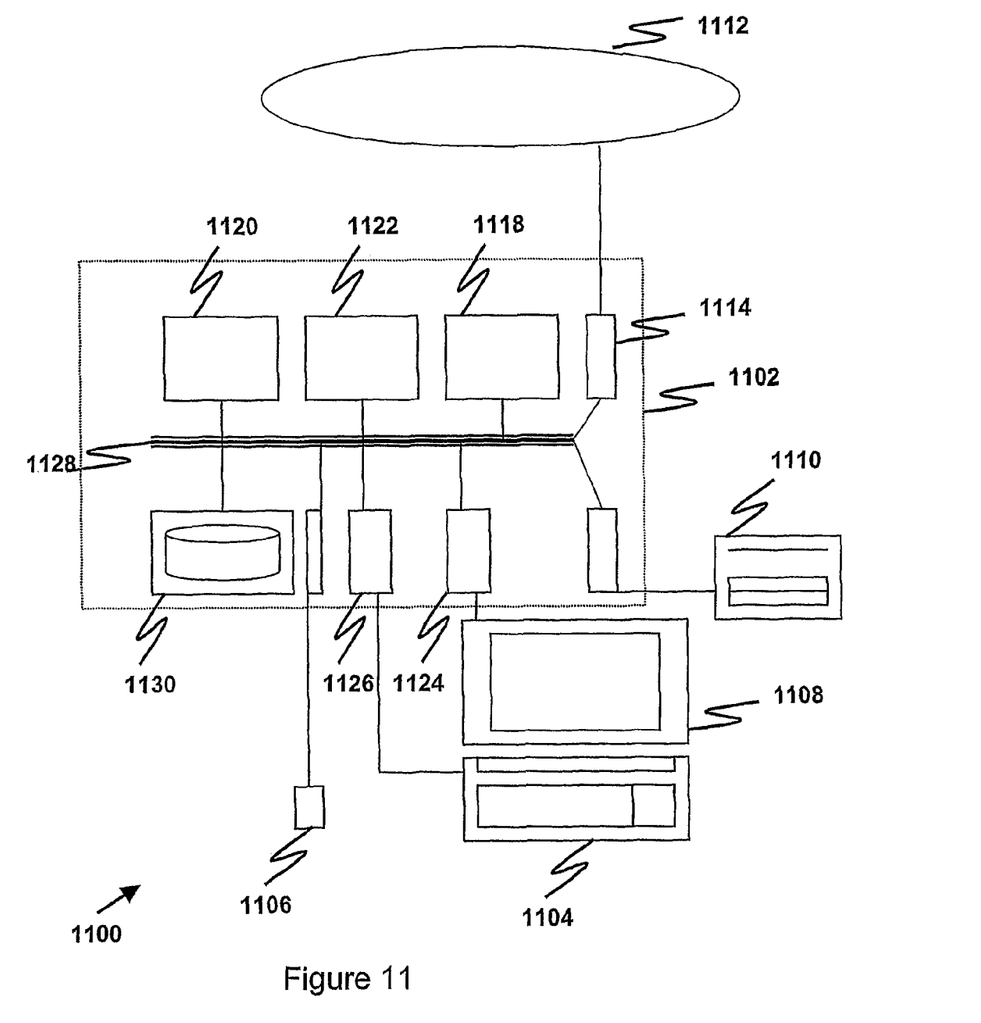
FIG. 11 is a schematic drawing of a computer system for implementing the method and system according to an example embodiment.

The method and system of the example embodiment can be implemented on a computer system 1100, schematically shown in FIG. 11. It may be implemented as software, such as a computer program being executed within the computer system 1100, and instructing the computer system 1100 to conduct the method of the example embodiment.

The computer system 1100 comprises a computer module 1102, input modules such as a keyboard 1104 and mouse 1106 and a plurality of output devices such as a display 1108, and printer 1110.

The computer module 1102 is connected to a computer network 1112 via a suitable transceiver device 1114, to enable access to e.g. the Internet or other network systems such as Local Area Network (LAN) or Wide Area Network (WAN).

The computer module 1102 in the example includes a processor 1118, a Random Access Memory (RAM) 1120 and a Read Only Memory (ROM) 1122. The computer module 1102 also includes a number of Input/Output (I/O) interfaces, for example I/O interface 1124 to the display 1108, and I/O interface 1126 to the keyboard 1104.

The components of the computer module 1102 typically communicate via an interconnected bus 1128 and in a manner known to the person skilled in the relevant art.

The application program is typically supplied to the user of the computer system 1100 encoded on a data storage medium such as a CD-ROM or floppy disk and read utilising a corresponding data storage medium drive of a data storage device 1130. The application program is read and controlled in its execution by the processor 1118. Intermediate storage of program data maybe accomplished using RAM 1120.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of measuring a quality of a test video stream, the method comprising:
measuring a content richness fidelity feature of the test video stream based on occurrences of color values in image frames of the test video stream;
measuring a block-fidelity, feature of the test video stream based on distortion at block-boundaries in the image frames of the test video stream;
measuring a distortion-invisibility feature of the test video stream based on distortion at pixels of the image frames of the test video stream; and
determining a quality rating for the test video stream based on the content richness fidelity feature, the block-fidelity feature and the distortion-invisibility feature measured.

2. The method as claimed in claim 1, wherein the measuring of the content richness fidelity feature of the test video stream is based on a sum of products for each colour and each frame, wherein each product comprises the product of a probability of occurrence of said each colour in said each image frame, and a logarithmic of said probability.

3. The method as claimed in claims 1 or 2, wherein the measuring of the block-fidelity feature of the test video stream is based on distortion at 4-pixel sub-block boundaries.

4. The method as claimed in claim 1, wherein the measuring of the content richness fidelity feature is based on occurrences of color values in corresponding image frames of the test video stream and an original video stream from which the test video stream has been derived.

5. The method as claimed in claim 4, wherein the measuring of the block-fidelity feature of the test video stream is based on distortion at block-boundaries in corresponding image frames of the test video stream and the original video stream from which the test video stream has been derived.

6. The method as claimed in claim 1, wherein the measuring of the block-fidelity feature of the test video stream is based on distortion at block-boundaries in corresponding image frames of the test video stream and an original video stream from which the test video stream has been derived.

7. The method as claimed in claim 1, wherein the measuring of the distortion-invisibility feature of the test video stream is based on a visibility threshold value.

8. The method as claimed in claim 7, wherein the visibility threshold value is based on one or more masking effects determined for the test video stream and the original video stream.

9. The method as claimed in claim 8, wherein the masking effects comprise one or more of a group consisting of colour masking, temporal masking and spatial-textural masking.

10. The method as claimed in claim 9, wherein the measuring of the distortion-invisibility feature of the test video stream is based on distortion at pixels of corresponding image frames-of the test video stream and the original video stream from which the test video stream has been derived.

11. The method as claimed in claim 1, wherein the measuring of the distortion-invisibility feature of the test video stream is based on distortion at pixels of corresponding image frames of the test video stream and the original video stream from which the test video stream has been derived.

12. The method as claimed in claim 11, wherein the measuring of the distortion-invisibility feature of the test video stream is based on processing of current and previous image frames of the test video stream and the original video stream.

13. A system for measuring a quality of a test video stream, the system comprising:
means for measuring a content richness fidelity feature of the test video stream based on occurrences of color values in image frames of the test video stream;
means for measuring a block-fidelity feature of the test video stream based on distortion at block-boundaries in the image frames of the test video stream;
means for measuring a distortion-invisibility feature of the test video stream based on distortion at pixels of the image frames of the test video stream; and
means for determining a quality rating for the test video stream based on the content richness fidelity feature, the block-fidelity feature and the distortion-invisibility feature measured.

14. A system for measuring a quality of a test video stream, the system comprising:
a color processor measuring a content richness fidelity feature of the test video stream based on occurrences of color values in image frames of the test video stream;

a distortion processor measuring a block-fidelity feature of the test video stream based on distortion at block-boundaries in the image frames of the test video stream and measuring a distortion-invisibility feature of the test video stream based on distortion at pixels of the image frames of the test video stream; and a quality rating processor determining a quality rating for the test video stream based on the content richness fidelity feature, the block-fidelity feature and the distortion-invisibility feature measured.

15. A computer readable data storage medium having stored thereon program code means for instructing a computer to execute a method of measuring a quality of a test video stream, the method comprising:

measuring a content richness fidelity feature of the test video stream based on occurrences of color values in image frames of the test video stream;

measuring a block-fidelity feature of the test video stream based on distortion at block-boundaries in the image frames of the test video stream;

measuring a distortion-invisibility feature of the test video stream based on distortion at pixels of the image frames of the test video stream; and determining a quality rating for the test video stream based on the content richness fidelity feature, the block-fidelity feature and the distortion-invisibility feature measured.

* * * * *